United States Patent Office 3,776,876
Patented Dec. 4, 1973

3,776,876
SPREADABLE COVERING MATERIAL
Jens Juul Christensen, Bedford, Ohio, assignor of a fractional part interest to W. J. Ruscoe Company, Akron, Ohio
No Drawing. Continuation-in-part of abandoned application Ser. No. 6,555, Jan. 28, 1970. This application Feb. 15, 1972, Ser. No. 226,518
Int. Cl. C08d 7/08, 9/08
U.S. Cl. 260—29.7 R    9 Claims

ABSTRACT OF THE DISCLOSURE

A covering material comprising an air setting, spreadable homogeneous mixture made from normally incompatible organic solvent based elastomer cement, a water base neoprene latex, and a water base filler and/or pigment mixture.

---

This is a continuation-in-part of my prior application Ser. No. 6,555, filed Jan. 28, 1970, now abandoned.

The present invention relates to new types of spreadable covering and/or coating materials and to the formulations thereof.

BACKGROUND OF THE INVENTION

In the past, many different types of relatively viscous coating formulations have been provided for coating various basement floors, factory floors, steps and the like, and they have been used in different manners over a number of years. In many of these coating formulations, efforts have been made to include vulcanized rubber scrap, or other low cost filler materials therein. In general, most of these previous compositions, insofar as I am aware, have been either a water base or an organic solvent base formulation. These coating materials should have very good shelf life, should be of satisfactory colors, and should be available at relatively low cost. While efforts have been made to provide a satisfactory, low cost covering material heretofore, such products are not sufficiently resilient in many instances as would be desired, the formed surface is not wear resistant, or the compositions do not remain homogeneous when stored in containers, or the cost of the coating material may be relatively high, or other disadvantages may exist in such previous compositions.

The general object of the present invention is to provide a novel and improved durable coating and/or covering material and an improved formulation therefor, which material may be formed within a wide range of viscosities and be easily applied to a desired surface.

Another object of the invention is to combine the use of both water base and organic solvent base materials in the preparation of a homogeneous, viscous coating composition which remains mixed and ready for use over extended periods of time.

Another object of the invention is to provide an improved, durable, resilient product which is homogeneous when stored and which has the property of air drying or curing when applied to an exposed surface to form a durable, resilient, tough, attractive, wear-resistant covering on the floor or other surface to which the product is applied.

A further object of the invention is to use relatively inexpensive filler materials in forming a coating composition and in providing novel formulations for such compositions to retain adhesive cements and filler materials in a stable composition which can be pigmented to provide desired finish colors in the coating product obtained.

Another object of the invention is to use a waste product such as vulcanized rubber tires, tire treads, rubber boot or shoe or hard rubber scrap to form a durable low cost coating material.

In making up the mixture of the invention, it has been found that the components thereof, in the percentages of materials used, may be varied relatively widely and still a very desirable coating or covering material can be obtained. The materials present and the ranges thereof may be stated as follows:

| Ingredients | Variations permissible | Preferred range | Specific example |
|---|---|---|---|
| Neoprene latex | 1 to 17 parts | 1.3 to 12 parts | 22.5 parts. |
| Neoprene cement | 40 to 80 parts | 60 to 79 parts | 132 parts. |
| Filler mixture | 10 to 30 parts | 16 to 20 parts | 33 parts. |
|  | 100 parts total. | 100 parts total. | 187.5 parts total. |

The actual ingredients of the different components of the present composition can be said to include a typical or conventional neoprene contact cement, a pigment-filler mixture containing any satisfactory pigments in association with suitable amounts of a filler such as rubber scrap, and the final ingredient is commercial neoprene latex having about 47 to 49% solids content therein.

In previous preparation of coating materials similar to those of the present invention, efforts have been made to provide coating material compositions that have high viscosity and/or high solids content as is necessary for heavy film application and ease and smoothness in the application of the composition. However, it has been difficult to provide compositions or systems of this type. Likewise, it has been proposed to have heavy loading proportions of inert fillers or extenders up to 100% of the other materials present, but such compositions have normally required the presence of plasticizers therein. Previous efforts to make these compositions, such as some of the mastic or caulk systems or compositions proposed heretofore have provided relatively unstable compositions and particularly the problem of crystallization of materials from the composition during storage has arisen.

While the present invention disclosure particularly relates to the use of neoprene types of elastomers, other elastomers or polymers can be used where it is desired to have other natural and/or synthetic rubber or rubber-like materials or elastomers used, they can be substituted for the neoprene latex and cements disclosed. A commercial grade of neoprene has been used in making the compositions of the invention, but various types of neoprene are available and can normally be substituted freely for each other in practice of the present invention. In practice of the invention, neoprene is particularly suitable because it has high values in adhesion to a wide variety of surfaces, neoprene has quite good aging properties, especially out of doors, and it is resistant to degradation by oils, water, heat and many common chemicals.

The neoprene contact cement used in practice of the invention is a commercial product and is a self-curing or polymerizing cement. The neoprene in such cement is the basic binding material in the cement and in the resultant composition of the invention and it is believed to comprise the outer phase of the solution forming the adhesive.

When rubber scrap is referred to in the present specification, it is taken to mean any type of vulcanized natural rubber, or synthetic rubber or elastomeric material which may be ground to relatively fine particle size, such as particles of about .025 inch for some uses or larger particles such as about .1 inch for most uses. But narrow fibers or shreds of the vulcanized elastomeric scrap, for example, about ½ inch long also may be used for many rough surfaced coatings.

It should also be understood that the type of scrap used can be varied widely, together with the particle or fiber size of such scrap, and the amount of scrap present in the composition. For example, tire or tire tread ground vulcanized scrap will impart resiliency and non-skid characteristics to the resultant composition and will provide, in general, a smooth or uniform appearance in the deposited product, which can be considered to be a carpet, or a carpet-like structure.

If it is desired to use a tougher or harder type of a vulcanized scrap, such as boot, shoe or hard rubber scrap, naturally the hardness of the resulting coating would be increased.

While rubber scrap types of fillers have been referred to, it should be realized that other small particle size fillers, such as sawdust, wood or cellulose particles, sand or aggregate, etc. can be used to impart rougher surfaces and harder characteristics to the end compositions.

It also should be noted that the rubber scrap used may be in the form of shreds of material wherein relatively large or elongated shreds or strings of the original rubber or similar material can be used in the composition of the invention and naturally a non-uniform finish characteristic will be obtained when that type of filler material is present.

While a major component of the composition of the invention comprises the addition of filler or extended materials or mixtures to a contact adhesive, it is also quite important that a small quantity of conventional neoprene latex be added to the composition. This neoprene latex is believed to aid in mixing the ground scrap preparation, or filler in the cement and thus a water base neoprene latex is believed to be retained in suspension or as a phase within the adhesive solution when amounts of neoprene latex are mixed in the composition described herein. Or, the neoprene latex could be added as a compounded latex adhesive.

Specifically, the coating material, as one example thereof, may comprise:

TYPICAL MIXTURE

| 132 g. cement | 33 g. filler mixture | 22.5 g. latex |
| --- | --- | --- |
| 15.7 neoprene. | 2.38 g. neoprene latex 1.. | 10.8 g. neoprene. |
| 108.2 g. organic solvents. | 6.63 g. TiO$_2$ Pigment 2.. | 11.1 g. water. |
| 1.7 magnesia, antioxidant, zinc oxide. | 3.17 g. H$_2$O | |
| 6.4 tertiary butyl phenolic resin. | .40 g. wetting, dispersing and/or stabilizing agents. | |
| | 20.43 rubber scrap | |

In making the cement, first the solids and neoprene are suitably mixed together on a mill. Such mix would comprise:

| | Parts |
| --- | --- |
| Neoprene | 100 |
| Magnesia | 4 |
| Antioxidant | 2 |
| Zinc oxide | 5 |
| | 111 |

Next, such milled stock would be added to a mixture (solution) of about 40 parts of a tackifier such as tertiary butyl phenolic resin and a suitable amount of an organic soluent in a churn, or mixing tank for blending them together to form a cement with about 18% solids therein. Hence, 688 parts of toluene were added to the mix to provide the organic solvent base contact adhesive.

The typical filler mixture is made from a color premix of a total weight of 15 lbs. For a substantially white or gray end color, such mix was composed of 65 parts titanium dioxide, 30.9 parts water, and suitably amounts, such as about 4.1 parts of conventional wetting, dispersing and/or stabilizing ingredients.

Next, 15 lbs. of such color mix has 3.5 lbs. of a conventional neoprene latex thoroughly blended therewith. Then 30 lbs. of No. 1 fine ground vulcanized rubber scrap is mixed into and dispersed throughout the latex and color mix to obtain a homogeneous filler mixture. Thus, the filler mixture has a neoprene latex, pigment and scrap content dispersed in a water base material.

As indicated, the neoprene latex is a conventional product and of course is water based. To prepare my new composition, the filler material is added to the cement and mixed therewith after which the neoprene latex is added to and mixed with the two previous ingredients to obtain a homogeneous blended mass. Such mass then normally would be troweled or painted onto a desired surface and it normally should be allowed to dry, cure and/or polymerize for at least 2, but preferably about 10 hours. The composition usually does cure, polymerize, or set up further with additional elapsed time.

It is thought that the presence of relatively small quantities of the neoprene latex in the end composition increases the acceptability of the scrap or filler particles in the adhesive base carrier material. The latex also provides a smoother and more homogeneous mixture and better application characteristics, and increased can or storage stability is provided in the end composition.

In other examples of the invention, its composition has been varied as follows:

| Neoprene cement | Filler mixture | Neoprene latex |
| --- | --- | --- |
| 79 parts | 19.7 parts | 1.3 parts. |
| 70.4 parts | 17.6 parts | 12 parts. |
| 66.5 parts | 16.6 parts | 16.9 parts. | and usable compositions were obtained over the ranges indicated.

While the presence of the neoprene latex in the formula works over a wide range, it is believed that as low of a neoprene latex content as about 1 up to about 17 percent can be used, but the preferred range is about 1.3 percent to about 12 percent of latex. The viscosity increased proportionally with higher latex content. Thus, when one is applying the composition to an end surface by hand, as by troweling, the composition should contain the higher quantities of latex, but for a spray application, the best formulations are provided with lower viscosity at the lower end of the neoprene latex content range.

In the formulation, the neoprene cement is of course the primary ingredient. The major component in this cement is one or more solvents such as toluol and ketones that are used to thin the mixture and make it easier to mix the cement with the other ingredients. While a tertiary butyl phenolix resin is added to the mixture to serve as a tackifier, any tackifier of this general type could be used and not significantly vary the properties of the cement. The small amounts of magnesia, zinc oxide, and an antioxidant are added as conventional compounding ingredients to improve the general properties of the cement and to make it polymerize or cure, and may be replaced by equivalents.

In the filler material, any pigment material may be added to obtain the color and/or shade desired. Or, no pigment may be required for some uses. By far the major component in the filler mix is the rubber scrap filler material. The exact amount and type of filler used may be altered widely to obtain various properties in the formulation.

As previously mentioned, the ratio of the various ingredients and/or some of their various components may be altered in order to vary the air curing or polymerizing capabilities, spread thickness and viscosity, and final characteristics of the formulation. In the typical mixture disclosed, rubber scrap constituted about 10.9%, water about 8.6% and neoprene about 14.7% of the overall formulation. It is understood this sample formulation does not limit the variations possible employing the general ingredients herein described.

This unique neoprene organic solvent and water combination of the invention makes possible very desirable covering formulations. Surprisingly, the components will blend together and can be applied to any desired surface. The composition bonds well to any dry surface and air sets or cures normally after the solvents have evaporated to form a tough, wear resistant layer. The set composition of the invention can be repaired or patched by a new deposit of the coating material which will bond to the previously deposited material. In the formulation, various amounts of cheap vulcanized rubber material or other fillers are present to otbain desired properties in the end layer, and a stable mix can still be obtained.

The properties of the coating material may also be varied widely by the selection of the polymer used, its grade, the processing of the polymer into a cement, the type of solvent used, the type and amount of curing and filler materials used, etc.

Normal evaporation of the solvent materials permits "air curing" or "polymerization" in the resulting dried film.

The "air curing" is a progressive change, noticeable in most adhesive and coating formulations. However, in this case, the formula structure herein presented changes the ultilitarian aspect of an eccepted "bonding" or "contact" cement to a practical and useful, tough, wear and slip resistant coating of controllable texture.

While, to a degree, this film toughness is noticeable in normal dried "contact" or bonding cements, it is definitely improved upon in the type of formulation disclosed herein.

The filler material used while having a water base, normally has the water removed as by blowing air through the mix or some water is absorbed by the other ingredients so that when mixed with the contact cement and latex, it is added as seemingly an essentially dry material.

The composition of the invention is chemically basic.

Obviously, the type and composition of the vulcanized rubber scrap used in practice of the invention can vary widely. If vulcanized tire scrap is used, the scrap may be shredded and/or ground to suitable particle or shred size. These particles are usually embedded substantially uniformly in the composition and provide a durable skid resistant end product. Other low cost fillers as suggested hereinbefore can be used, when desired. The invention provides a use for what heretofore have frequently been considered scrap materials. Shreds of scrap used may be about $\frac{1}{16}$ inch thick or less and about one-half to one inch long.

The composition of the invention has good shelf life and remain homogeneous and spreadable for long periods of time when stored in closed container.

The compositions have a pH of from about 8.7 to about 9.35.

The scrap material used, which may be formed from scrap or used rubber tires and/or any suitable portions thereof, may be ground or shredded to particle size as previously stated and then be added to the rubber cement and latex mix. That is, about 10 to 30 parts of the scrap particles, without any other ingredients, can be used with the 40 to 80 parts neoprene cement and 1 to 17 parts of the neoprene latex.

A typical formulation from sawdust comprised about (parts by weight):

Cement (neoprene as identified hereinbefore) _____ 25.2
Sawdust _____ 14.5
Neoprene latex _____ 12.7
Toluol (considered part of the cement) _____ 47.6

An abrasion resistant, durable, non-skid coating was obtained by spreading this composition on a support surface and letting it air cure or set. Other suitable rubber solvents can be substituted for the toluol, as desired. Natural rubber latex can be used in place of part or all of the neoprene latex if oil and weather resistance are not required in the end product.

Any desired pigment may be used in the composition in reasonable quantities to obtain the desired color for the end product.

While several complete embodiments of the invention have been disclosed herein, it will be appreciated that modification of these particular embodiments of the invention may be resorted to without departing from the scope of the invention.

What is claimed is:

1. A chemically basic covering material comprising an air setting, homogeneous mixture made primarily from an organic solvent based neoprene cement, a small amount of a water base neoprene latex, and more parts of water base filler mixture made of neoprene latex, particles of vulcanized tire, boot, shoe or hard rubber scrap and pigments than of the said water base neoprene latex where about 40-80 parts of elastomer cement, about 1-17 parts of latex and about 10-30 parts of filler are present.

2. A covering material as in claim 1 wherein said filler mixture consists of only particles of ground or shredded vulcanized rubber scrap.

3. A covering material as in claim 1 where the materials are mixed in the proportions of about 132 parts of neoprene cement, about 22.5 parts of neoprene latex, and about 33 parts of the filler mixture.

4. A covering material as in claim 1 where said covering materials has as a major ingredient therein a conventional neoprene contact cement diluted by a solvent.

5. A covering material as in claim 1 where said material remains homogeneous after it is prepared and it is primarily made from a neoprene cement, said filler material comprising over 50% of particles of scrap material.

6. A covering material as in claim 1 were the filler material is bulky and is selected from the group consisting of vulcanized tire, boot, shoe or had rubber scrap, sawdust, wood and sand.

7. A chemically basic covering material comprising an air setting, homogeneous mixture consisting essentially of an organic solvent based elastomer cement as a principal ingredient, a small amount of a water based latex, and more parts of a filler material selected from the group consisting of particles of vulcanized tire, boot, shoe or hard rubber scrap, sawdust, wood and sand than of the said water based neoprene latex where about 40-80 parts of elastomer cement, about 1-17 parts of latex and about 10-30 parts of filler are present.

8. A covering material is in claim 7 where the elastomer cement is made from neoprene and the latex is neoprene latex.

9. A covering material as in claim 7 where said elastomer cement comprises about 18 parts of solids.

References Cited
UNITED STATES PATENTS

| | | | |
|---|---|---|---|
| 3,527,146 | 9/1970 | Garling | 94—7 |
| 3,293,197 | 12/1966 | Vincent | 260—2.5 |
| 3,562,193 | 2/1971 | Leeks et al. | 260—894 |

THEODORE MORRIS, Primary Examiner

U.S. Cl. X.R.

260—41.5 R, 894

UNITED STATES PATENT OFFICE
CERTIFICATE OF CORRECTION

Patent No. 3,776,876   Dated December 4, 1973

Inventor(s) Jens Juul Christensen

It is certified that error appears in the above-identified patent and that said Letters Patent are hereby corrected as shown below:

Column 3, line 43 (in formula) change "6.4 tertiary butyl" to --6.4g tertiary butyl--.

Column 3, line 44 (in formula) change "20.43 rubber scrap" to --20.43g rubber scrap--.

Column 3, line 59, change "soluent" to --solvent--.

Column 3, line 66, change "suitably" to --suitable--.

Column 5, line 6, change "otbain" to --obtain--.

Column 5, line 18, change "eccepted" to --accepted--.

Column 5, line 43, change "remain" to --remains--.

Column 6, line 21, change "wherein" to --where--.

Column 6, line 29, change "materials" to --material--.

Column 6, line 37, change "had" to --hard--.

Signed and sealed this 21st day of May 1974.

(SEAL)
Attest:

EDWARD M. FLETCHER, JR.
Attesting Officer

J. MARSHALL DANN
Commissioner of Patents